United States Patent
Grammatke et al.

(10) Patent No.: US 7,729,788 B2
(45) Date of Patent: Jun. 1, 2010

(54) METHOD AND FACILITY FOR POSITIONING AN ELEMENT OF A MACHINE

(75) Inventors: Kay Grammatke, Hartmannsdorf (DE); Tino Heber, Freiberg (DE); Raimund Kram, Erlangen (DE)

(73) Assignee: Siemens Aktiengesellschaft, Munich (DE)

(*) Notice: Subject to any disclaimer, the term of this patent is extended or adjusted under 35 U.S.C. 154(b) by 245 days.

(21) Appl. No.: 11/885,574

(22) PCT Filed: Feb. 28, 2006

(86) PCT No.: PCT/EP2006/060340

§ 371 (c)(1),
(2), (4) Date: Sep. 4, 2007

(87) PCT Pub. No.: WO2006/092400

PCT Pub. Date: Sep. 8, 2006

(65) Prior Publication Data

US 2008/0281441 A1 Nov. 13, 2008

(30) Foreign Application Priority Data

Mar. 4, 2005 (DE) .................. 10 2005 010 089

(51) Int. Cl.
*G05B 19/18* (2006.01)
*G06F 19/00* (2006.01)

(52) U.S. Cl. ........................................ 700/56; 700/193
(58) Field of Classification Search .................. 700/56, 700/193
See application file for complete search history.

(56) References Cited

U.S. PATENT DOCUMENTS

| 4,651,073 | A | 3/1987 | Shimizu et al. |
| 5,056,038 | A | 10/1991 | Kuno et al. |
| 6,618,000 | B2 * | 9/2003 | Winner et al. ................ 342/71 |

FOREIGN PATENT DOCUMENTS

| DE | 33 31 648 A1 | 3/1985 |
| DE | 37 13 271 A1 | 11/1988 |
| DE | 39 38 083 C2 | 1/1993 |
| DE | 195 17 771 A1 | 11/1996 |
| EP | 0 701 187 A2 | 3/1996 |

OTHER PUBLICATIONS

Komada et al., "Robust Hybrid Position/Force Control of Robot Manipulators Considering Environment Changes", Industrial Electronics, Control and Instrumentation, 1994, pp. 1627-1632, IECON '94., 20$^{th}$ International Conference on Bologna, Italy, Sep. 5-9, 1994, New York, N.Y. USA, IEEE, vol. 3, Sep. 5, 1994, Abb. 2.

* cited by examiner

*Primary Examiner*—Ramesh B Patel
*Assistant Examiner*—Sivalingam Sivanesan

(57) ABSTRACT

There is described a method and a device for positioning an element of a machine. A setpoint position variable is generated, said setpoint position variable is reduced by means of a limiting variable and a modified setpoint position variable which is forwarded as a setpoint variable to a controller for positioning the element is formed in this manner. An expected setpoint position variable is determined from the modified setpoint position variable, the braking distance of the element is determined from the expected setpoint position variable, and a braking process of the element is initiated if the braking distance matches a target position which is reduced by the expected setpoint position variable. An element of a machine can so be positioned with accuracy.

14 Claims, 2 Drawing Sheets

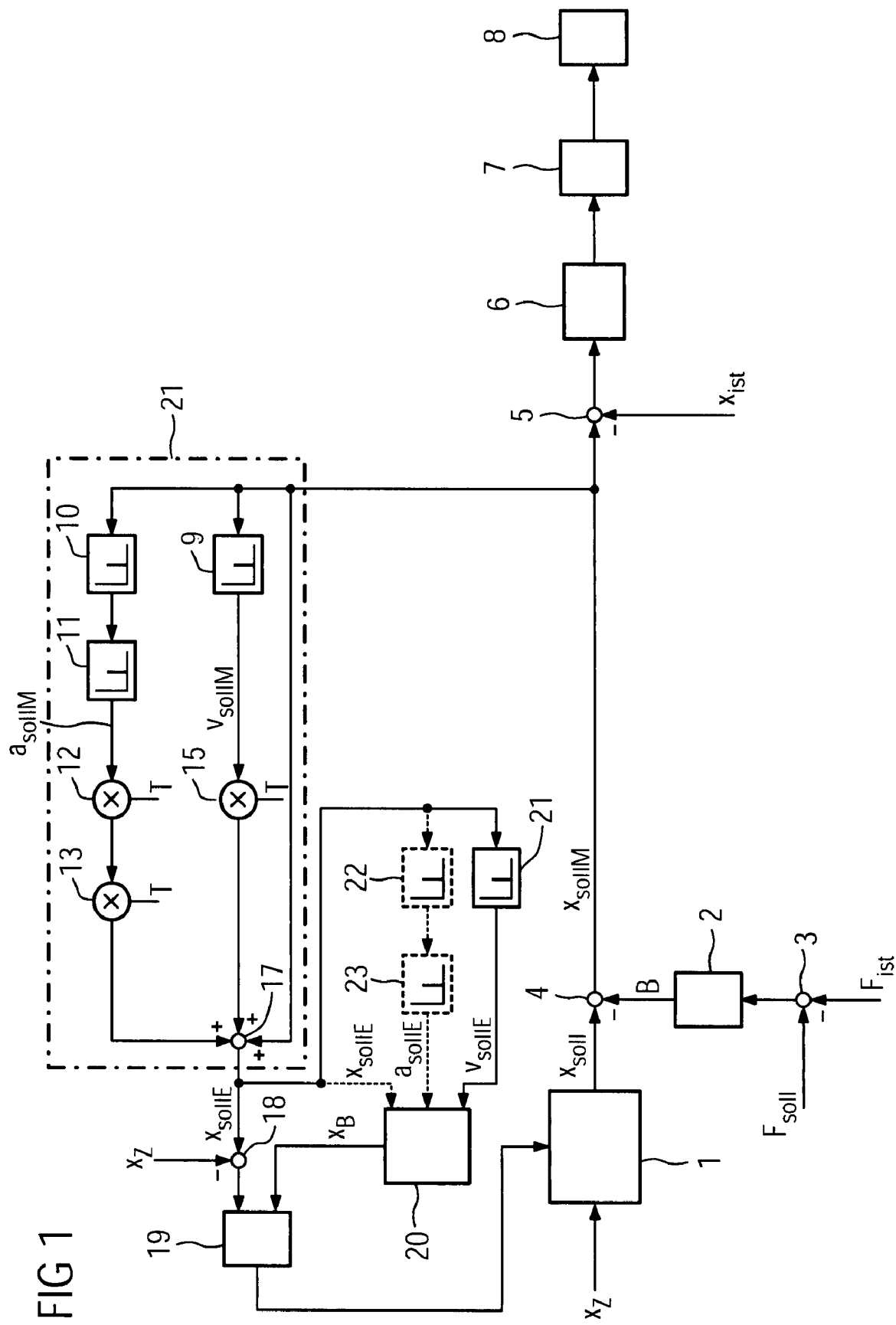

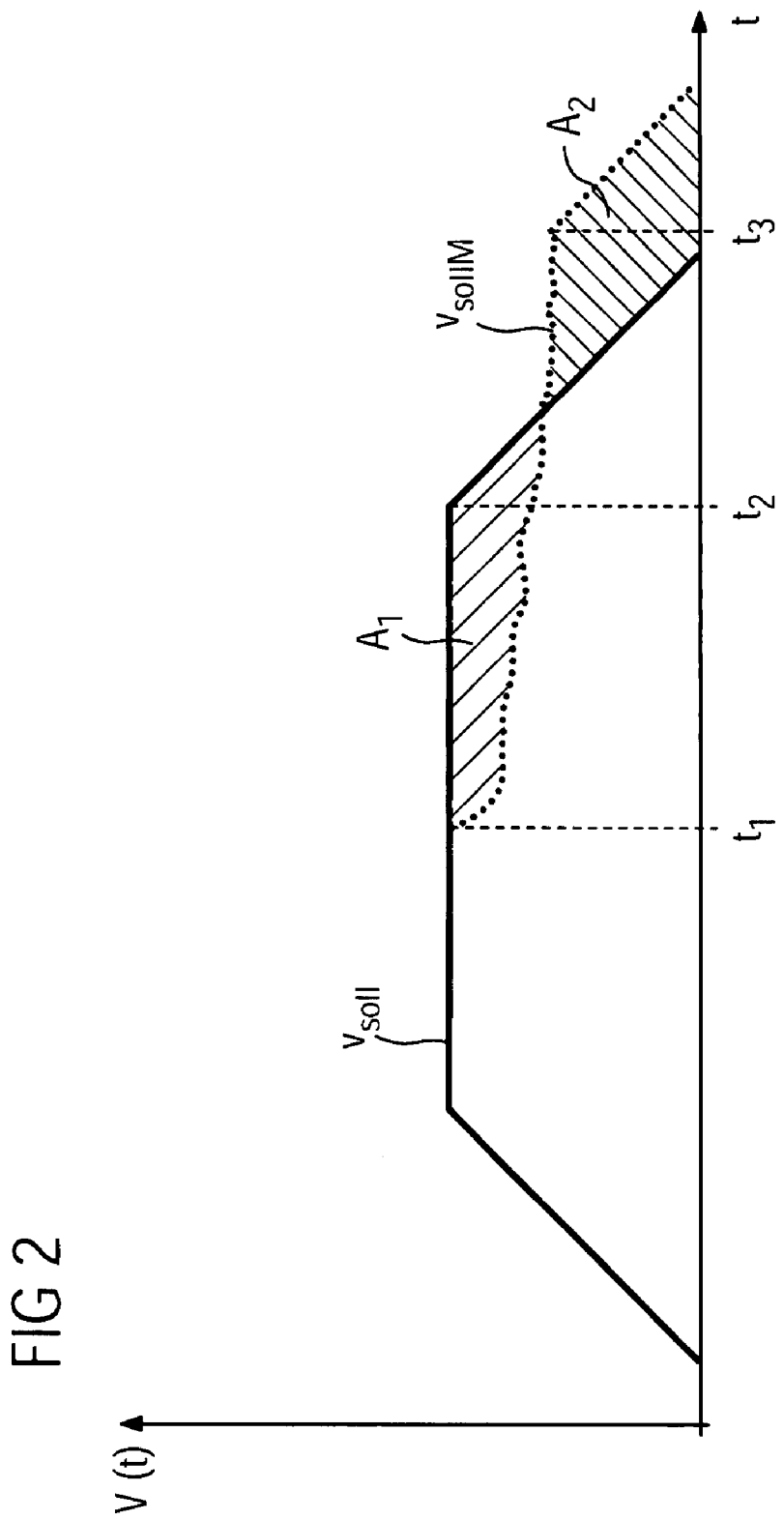

METHOD AND FACILITY FOR POSITIONING AN ELEMENT OF A MACHINE

CROSS REFERENCE TO RELATED APPLICATIONS

This application is the U.S. National Stage of International Application No. PCT/EP2006/060340, filed Feb. 28, 2006 and claims the benefit thereof. The International Application claims the benefits of German application No. 10 2005 010 089.9 DE filed Mar. 4, 2005, both of the applications are incorporated by reference herein in their entirety.

FIELD OF INVENTION

The invention relates to a method and facility for positioning an element of a machine.

BACKGROUND OF INVENTION

In the case of machines, such as robots, machine tools and/or production machines for example, movable elements of the machine, such as tools or workpieces, have to be positioned precisely. To position the element in the case of commercially available machines a positioning command, for example to displace the element to a defined target location, in other words to a defined position, is sent to a reference variable generation unit as an input variable. The reference variable generation unit uses the positioning command to generate a corresponding setpoint position variable, which is forwarded in the form of individual setpoint position values as a setpoint variable to a controller for positioning the element. The controller controls a drive unit of a machine axle, which then displaces the element according to the setpoint position variable and positions it thus. In the case of many machines, for example plastics machines or presses, it is often necessary to limit physical variables that occur during the displacement process, for example the pressure and/or force occurring. A so-called limit controller is generally used for this purpose, which intervenes when a setpoint value (for example maximum permitted pressure and/or force) is exceeded and outputs a limit variable, by which the setpoint position variable generated by the reference variable generation unit is reduced, before the setpoint position variable is forwarded to the controller as the setpoint variable for the controller. Since the controller no longer receives the original setpoint position variable but a thus modified (reduced) setpoint variable as the input variable, precise positioning of the element to be displaced no longer takes place. The element to be displaced is therefore not positioned precisely in the target location defined by the positioning command but the displacement movement of the element is stopped earlier so that the target location is no longer reached.

In such an instance until now an operator of the machine generally had to displace the element by manual control into the required position, in other words to the target location, or the displacement speed of the element had to be reduced, so that for example the force occurring, which occurred during displacement of the element, is smaller and the limit controller no longer intervenes and the setpoint position variable is thus not reduced, before the setpoint position variable is forwarded to the controller as a setpoint variable for the controller. However these procedures used until now result in longer processing times and therefore higher costs.

SUMMARY OF INVENTION

An object of the invention is to allow precise positioning of an element of a machine with the aid of an appropriate method and an appropriate facility.

This object is achieved by a method for positioning an element of a machine,
with a setpoint position variable being generated,
with the setpoint position variable being reduced by a limit variable and a modified setpoint position variable thus being formed, which is forwarded as a setpoint variable to a controller for positioning the element,
with an expected setpoint position variable being determined from the modified setpoint position variable,
with the braking distance of the element being determined from the expected setpoint position variable,
with a braking process of the element being initiated, when the braking distance corresponds to a target location reduced by the expected setpoint position variable.

This object is also achieved by a facility for positioning an element of a machine, with the facility having
means for generating a setpoint position variable,
means for generating a limit variable, with the setpoint position variable being reduced by a limit variable and a modified setpoint position variable thus being formed, which is forwarded as a setpoint variable to a controller for positioning the element,
means for determining an expected setpoint position variable from the modified setpoint position variable,
means for determining a braking distance of the element from the expected setpoint position variable,
means for initiating a braking process of the element, which initiate the braking process, when the braking distance corresponds to a target location reduced by the expected setpoint position variable.

It proves to be advantageous that the braking distance of the element is determined from the expected setpoint position variable, in that an expected setpoint speed of the element is determined from the expected setpoint position variable and/or an expected setpoint acceleration is determined and the braking distance is determined based on the expected setpoint position variable and/or the expected setpoint speed and/or the expected setpoint acceleration. This allows precise determination of the braking distance.

It also proves to be advantageous that the expected setpoint position variable is determined from the modified setpoint position variable by means of an extrapolation. This measure allows very precise determination of the expected setpoint position variable.

It also proves to be advantageous that the limit variable is given in the form of a force and/or pressure-limiting variable. Physical variables such as force and/or pressure are generally the limiting variables in the case of commercially available machines.

It also proves to be advantageous that the braking process is initiated by adjusting the generated setpoint position variable according to the braking process. This allows simple control of the braking process.

It also proves to be advantageous that an interpolator is provided as the means for generating the setpoint position variable. An interpolator represents a standard means for generating the setpoint position variable.

It also proves to be advantageous that a limit controller is provided as the means for generating the limit variable. A limit controller represents a standard means for generating a limit variable.

It also proves to be advantageous that an extrapolation unit is provided as the means for determining the expected setpoint position variable from the modified setpoint position variable. It is possible to determine the expected setpoint position variable particularly precisely from the modified setpoint position variable with the aid of an extrapolation unit.

It also proves to be advantageous that the means for initiating a braking process of the element initiate the braking process by acting on the means for generating the setpoint position variable, with the means for generating the setpoint position variable adjusting the setpoint position variable according to the braking process. This allows particularly simple initiation of the braking process.

Machine tools, production machines and/or robots are the standard machines, in which an element, such as a tool and/or a workpiece for example, has to be positioned precisely. Of course the present invention is however also suitable for positioning elements in other machines.

BRIEF DESCRIPTION OF THE DRAWINGS

An exemplary embodiment of the invention is illustrated in the drawing and described in more detail below. In the drawing:

FIG. 1 shows an inventive method and facility for positioning an element of a machine and FIG. 2 shows the pattern over time of the setpoint speed and the modified setpoint speed.

DETAILED DESCRIPTION OF INVENTION

FIG. 1 shows the inventive method in the form of a block circuit diagram and the inventive facility in the form of an exemplary embodiment. A target location $x_Z$, in other words the position to which an element 8 is to be displaced, serves as the input variable of a reference variable generation unit 1. The reference variable generation unit 1 is commercially available in the form of an interpolator. The reference variable generation unit 1 generates a setpoint position variable $x_{soll}$ as a function of time t according to the target location $X_Z$. The force $F_{ist}$ occurring during displacement of the element 8 is measured by way of a sensor and supplied to a subtracter 3 as an input variable. The measured force $F_{ist}$ is subtracted by means of the subtracter 3 from a predetermined setpoint force (generally this is the maximum permitted force for the displacement process) and supplied as an input variable to a limit controller 2. If the measured force $F_{ist}$ exceeds the setpoint force $F_{soll}$, the limit controller 2 generates a limit variable B, which is subtracted from the setpoint position variable $x_{soll}$ by means of the subtracter 4. The setpoint position variable $x_{soll}$ is thus reduced by the limit variable B and a modified setpoint position variable $x_{sollM}$ is output by the subtracter 4 as the result of the subtraction. In the exemplary embodiment the current location of the element 8 is measured by means of a position sensor, which outputs the current location $x_{ist}$ of the element and forwards it as an input variable to a subtracter 5. The modified setpoint position variable $x_{sollM}$ is forwarded to a controller, which in the exemplary embodiment comprises the subtracter 5 and a position controller 6. The difference between the modified setpoint position variable $x_{sollM}$ and the current position $x_{ist}$ is supplied as an input variable to the position controller 6, which controls a drive unit 7 to displace a machine axle of the machine. The drive unit 7 is used to displace the machine element 8 to the location, in other words the position, which is predetermined by the modified setpoint position variable $x_{sollM}$ as the setpoint variable of the controller.

As already mentioned above, the problem arises during the positioning of the element 8 that when the limit controller 2 generates the limit variable B, because the setpoint force $F_{soll}$ is exceeded during the displacement process of the element 8, the value of the modified setpoint position variable $x_{sollM}$ no longer corresponds to the setpoint position variable $x_{soll}$ but is reduced by the value of the limit variable B. In the case of commercially available machines the reference variable generation unit 1 has no knowledge here of whether or not the limit controller 2 is in the process of intervening. Since if the limit controller 2 intervenes, the modified setpoint position variable $x_{sollM}$ is smaller than the setpoint position variable $x_{soll}$, the target location $x_z$, in other words the desired position of the element 8 at the end of the displacement process, is no longer reached but the element 8 stops before the desired position. In the case of a plastics machine, this can result in the required product being produced incorrectly.

FIG. 2 shows the displacement process of the element 8 graphically yet again, with the setpoint speed $v_{soll}$ being the setpoint position variable $x_{soll}$ derived after time t and the modified setpoint speed $v_{sollM}$ being the variable of the modified setpoint position variable $x_{sollM}$ after time t. If the limit controller 2 does not intervene during the displacement process, in other words the limit variable B has a value of zero, the solid setpoint curve is followed, in other words there is acceleration in a first segment, displacement at a constant setpoint speed in a further segment and braking with a constant deceleration in a further segment, until the setpoint speed is zero and the element 8 has reached the target location. The surface area resulting below the graph of the setpoint speed corresponds to the displacement distance covered by the element 8. Since the reference variable generation unit 1 knows the deceleration $a_v$, with which it can slow down the displacement process of the element 8, it knows that it must initiate the braking process at time t2, if the element 8 is to stop at the target position.

If however the limit controller 2 intervenes at time t1, because the force occurring during the displacement process is too great, the setpoint position variable $x_{soll}$ is reduced by the limit variable B, so that the modified setpoint position variable $x_{sollM}$ is smaller than the setpoint position variable $x_{soll}$, as a result of which the modified setpoint speed $v_{sollM}$ (derivation of the setpoint position variable $x_{soll}$ over time) is similarly smaller than the setpoint speed $v_{soll}$ from time t1. If the braking process is again initiated at time t2, as is standard for commercially available machines, the desired position of the element 8, in other words the target location $x_z$, is not reached and the element 8 comes to a stop before it. The present invention is applicable now.

The modified setpoint position variable $x_{sollM}$ is supplied as an input variable to an extrapolation unit 21, which determines an expected setpoint position variable $x_{sollE}$, which preferably corresponds to the setpoint position variable $x_{soll}$, which would be generated by the reference variable generation unit 1 during the next interpolation clock pulse. (The interpolation clock pulse period T of the interpolation clock pulse is preferably the time period between two consecutively generated setpoint position values of the setpoint position variable $x_{soll}$. The interpolation clock pulse period T can be a millisecond for example). The modified setpoint position variable $x_{sollM}$ is differentiated to this end within the extrapolation unit 21 first consecutively twice by means of the two differentiators 10 and 11 (corresponding to two derivations after time t) and a modified setpoint acceleration $a_{sollM}$ is thus calculated. This is then supplied as an input variable to a multiplier 12, which carries out a multiplication of the modified setpoint acceleration $a_{sollM}$ and the interpolation clock pulse period T. The output signal of the multiplier 12 is then supplied as an input variable to a multiplier 13 and this carries out a further multiplication using the interpolation clock pulse period T. The result of the multiplication is supplied as an input variable to an adder 17. The modified setpoint position variable $x_{sollM}$ is also differentiated once by means of the differentiator 9 (corresponding to a derivation after time t) and a modified setpoint speed $v_{sollM}$ is thus calculated, which is supplied as an input variable to a multiplier 15, which carries out a multiplication of the modified setpoint speed $v_{sollM}$ and the interpolation clock pulse period T. The result of the multiplication is supplied as an input variable to an adder 17. The modified setpoint position variable $x_{sollM}$ is also supplied as an input variable directly to the adder 17. As a result of the addition of the three signals the adder 17 generates the expected setpoint position variable $x_{sollE}$ on the output side. The expected setpoint position variable $x_{sollE}$ is thus determined from the modified setpoint position variable $x_{sollM}$ by extrapolation.

The expected setpoint position variable $x_{sollE}$ is supplied as an input variable to a subtracter 18, which subtracts the target location $x_z$ from the expected setpoint position variable $x_{sollE}$ and thus reduces the expected setpoint position variable $x_{sollE}$. The result of the subtraction is supplied to a comparator 19. The current braking distance $x_B$ is also determined from the expected setpoint position variable $x_{sollE}$ using means for determining a braking distance, which are present in the exemplary embodiment in the form of a braking distance calculation unit 20. In the simplest instance the expected setpoint position variable $x_{sollE}$ is differentiated to this end once by means of the differentiator 21, in other words derived after time t, as shown with a solid line, and the expected setpoint speed $v_{sollE}$ is thus determined and supplied as an input variable to the braking distance calculation unit 20. In the simplest instance this then calculates the braking distance $x_B$ according to the equation $$x_B = \frac{v_{sollE}^2}{2 \cdot a_v} \quad (1)$$

taking into account the predetermined deceleration $a_v$. It is of course also possible to calculate the braking distance $x_B$ in a much more complex manner, by for example also calculating an expected setpoint acceleration $a_{sollE}$ by means of the two differentiators 22 and 23 shown with a broken line and supplying this together with the expected setpoint position variable $x_{sollE}$ to the braking calculation unit 20, with this then determining the braking distance $x_B$ taking into account all three input variables. The deceleration $a_v$ also does not have to be constant as in the exemplary embodiment but can also be a function of one or more of the input variables of the braking distance calculation unit 20.

If the braking distance $x_B$ corresponds to the target location $x_z$ reduced by the expected setpoint position variable $x_{sollE}$, the braking process is initiated in that a signal is sent from means for initiating a braking process, which are present in the exemplary embodiment in the form of a comparator 19, to the reference variable generation unit 1, which in the exemplary embodiment represents a means for generating a setpoint position variable. When the reference variable generation unit 1 receives the signal from the comparator 19, the setpoint position variable $x_{soll}$ to be generated is adjusted according to the braking process. The setpoint position variable $x_{soll}$ is hereby generated by the reference variable generation unit 1 such that the element 8 is slowed down with the predetermined deceleration $a_z$.

The element 8 then stops precisely at the required target location $x_z$, in other words at the required position.

In FIG. 2 at time $t_3$ the braking distance $x_B$ corresponds to the difference between the expected setpoint position variable $x_{sollE}$ and the target location $x_z$, so that the comparator 19 sends a signal to the reference variable generation unit 1, which then initiates the braking process with the constant deceleration $a_v$, so that the speed graph shown in FIG. 1 with a broken line results. The surface area content of the surface areas $A_1$ and $A_2$ shown hatched in FIG. 2 is identical here.

It is also possible, for example to save computation capacity, not to have the extrapolation unit 21, the comparator 19, the subtracter 18 and the braking calculation unit 20, as well as the differentiators 21, 22 and 23 running all the time but just when the limit controller 2 intervenes.

The invention claimed is:

1. A method for positioning an element of a machine, comprising:
   generating a setpoint position variable by a reference variable generation unit such that an element is slowed down with a predetermined deceleration;
   reducing the setpoint position variable based upon a limit variable, wherein a modified setpoint position variable is formed, wherein the limit variable is a force-limiting variable or a pressure-limiting variable, wherein a limit controller limits a force or pressure value;
   forwarding the modified setpoint position as a setpoint variable to a controller for positioning the element, wherein the element is a part of a plastic machine or a press;
   determining an expected setpoint position variable based upon the modified setpoint position variable using an extrapolation; determining a braking distance of the element based upon the expected setpoint position variable; and
   initiating a braking process of the element, when the braking distance corresponds to a target location reduced by the expected setpoint position variable, wherein the element stops at the required target location.

2. The method as claimed in claim 1, wherein the braking distance of the element is determined based upon the expected setpoint position variable.

3. The method as claimed in claim 2, wherein an expected setpoint speed of the element is determined from the expected setpoint position variable for determining the braking distance.

4. The method as claimed in claim 3, wherein an expected setpoint acceleration is determined for determining the braking distance, wherein the expected setpoint acceleration is based upon the expected setpoint position.

5. The method as claimed in claim 2, wherein an expected setpoint acceleration is determined for determining the braking distance, wherein the expected setpoint acceleration is based upon the expected setpoint position.

6. The method as claimed in claim 2, wherein the braking distance is determined based upon a value selected from the group consisting of:
   the expected setpoint position variable,
   the expected setpoint speed,
   the expected setpoint acceleration, and
   a combination thereof.

7. The method as claimed in claim 1, wherein the braking process is initiated by adjusting the generated setpoint position variable according to the braking process.

8. A system for positioning an element of a machine, comprising:
- a first generator to generate a setpoint position variable such that the element is slowed down with a predetermined deceleration, wherein the element is a part of a plastic machine or a press;
- a second generator to generate a limit variable, wherein the limit variable is a force-limiting variable or a pressure-limiting variable, wherein a limit controller limits a force or pressure value, wherein the setpoint position variable is reduced based upon the limit variable to form a modified setpoint position variable, and wherein the modified setpoint position is forwarded as a setpoint variable to a controller for positioning the element;
- an extrapolation unit:
- an expected setpoint position variable based upon the modified setpoint position variable;

wherein the expected setpoint position is generated by the extrapolation unit;
- a braking distance of the element based upon the expected setpoint position variable; and
- an initiator for a braking process of the element to initiate the braking process, when the braking distance corresponds to a target location reduced by the expected setpoint position variable, wherein the element stops at the required target location.

9. The system as claimed in claim 8, wherein the first generator is an interpolator.

10. The system as claimed in claim 8, wherein the second generator is a limit controller.

11. The system as claimed in claim 8, wherein the braking process is initiated based upon the setpoint position variable, wherein the setpoint position variable is based upon the braking process.

12. A method for positioning an element of a plastic machine, comprising:
- providing the plastic machine performing the method;
- generating a setpoint position variable by a reference variable generation unit such that the element of the plastic machine is slowed down with a predetermined deceleration;
- reducing the setpoint position variable based upon a pressure-limiting variable controlled by a limit controller, wherein a modified setpoint position variable is formed;
- forwarding the modified setpoint position as a setpoint variable to a controller for positioning the element;
- determining an expected setpoint position variable based upon the modified setpoint position variable using an extrapolation;
- determining a braking distance of the element based upon the expected setpoint position variable; and
- initiating a braking process of the element, when the braking distance corresponds to a target location reduced by the expected setpoint position variable, wherein the element stops at the required target location.

13. The method as claimed in claim 12, wherein the braking distance of the element is determined based upon the expected setpoint position variable, and wherein an expected setpoint speed of the element is determined from the expected setpoint position variable for determining the braking distance.

14. The method as claimed in claim 13, wherein the braking distance is determined based upon the expected setpoint position variable, the expected setpoint speed, and the expected setpoint acceleration.

* * * * *